United States Patent
Vassieux et al.

(10) Patent No.: US 12,227,068 B2
(45) Date of Patent: Feb. 18, 2025

(54) PROPULSION SYSTEM FOR AN ELECTRIC VEHICLE

(71) Applicant: VALEO EMBRAYAGES, Amiens (FR)

(72) Inventors: Loic Vassieux, Cergy Pontoise (FR); Dominique Lheureux, Cergy Pontoise (FR); Thibault Lemaire, Cergy Pontoise (FR); Benoist Auffray, Cergy Pontoise (FR); Clément Derville Helluin, Cergy Pontoise (FR)

(73) Assignee: VALEO EMBRAYAGES, Amiens (FR)

(*) Notice: Subject to any disclaimer, the term of this patent is extended or adjusted under 35 U.S.C. 154(b) by 170 days.

(21) Appl. No.: 18/150,918

(22) Filed: Jan. 6, 2023

(65) Prior Publication Data
US 2023/0219411 A1   Jul. 13, 2023

(30) Foreign Application Priority Data
Jan. 8, 2022   (FR) ..................... 22 00123

(51) Int. Cl.
*B60K 1/02*   (2006.01)
*B60K 17/08*   (2006.01)
(Continued)

(52) U.S. Cl.
CPC ............ *B60K 17/08* (2013.01); *B60K 1/02* (2013.01); *B60K 17/165* (2013.01);
(Continued)

(58) Field of Classification Search
CPC ...... B60K 17/08; B60K 17/165; B60K 17/04; B60K 17/22; B60K 17/02; B60K 1/02;
(Continued)

(56) References Cited

U.S. PATENT DOCUMENTS

| 11,951,821 B2* | 4/2024 | Terrat ................. B60K 1/02 |
| 2007/0049439 A1* | 3/2007 | Garnett ............. B60L 15/2036 475/5 |

(Continued)

FOREIGN PATENT DOCUMENTS

| CN | 112356647 A | 2/2021 |
| CN | 113824238 A | 12/2021 |

(Continued)

OTHER PUBLICATIONS

Extended European Search Report issued May 22, 2023 in European Patent Application No. 22215688.7, 15 pages.

(Continued)

*Primary Examiner* — Jacob S. Scott
*Assistant Examiner* — Farhana Pervin
(74) *Attorney, Agent, or Firm* — Oblon, McClelland, Maier & Neustadt, L.L.P.

(57) ABSTRACT

A propulsion system for an electric vehicle includes an assembly of four electric propulsion machines each having a stator and a rotor having an output shaft that is movable in rotation about an axis. Also includes is a common gearwheel that is kinematically connected to the n output shafts and that is able to receive the torque provided by the electric machines so as to form a first speed reducer, and primary gearwheels able to be driven by the common gearwheel. An intermediate shaft is able to be driven by intermediate gearwheels, each primary gearwheel being kinematically connected to a corresponding intermediate gearwheel so as to form a pair of gears with which a second speed reducer is associated, and a secondary shaft that is able to drive the vehicle and that has a secondary gearwheel kinematically connected to the intermediate shaft so as to form a third speed reducer.

20 Claims, 4 Drawing Sheets

(51) Int. Cl.
*B60K 17/16* (2006.01)
*F16H 37/08* (2006.01)
*F16H 57/02* (2012.01)
*F16H 57/04* (2010.01)

(52) U.S. Cl.
CPC ......... *F16H 37/0806* (2013.01); *F16H 57/02* (2013.01); *F16H 57/0415* (2013.01); *F16H 2057/02034* (2013.01); *F16H 2057/02043* (2013.01); *F16H 2200/0021* (2013.01); *F16H 2200/0034* (2013.01)

(58) Field of Classification Search
CPC .............. B60K 2001/006; B60K 11/02; F16H 37/0806; F16H 37/065; F16H 57/02; F16H 57/0415; F16H 2057/02034; F16H 2057/02043; F16H 2200/0021; F16H 2200/0034; F16H 1/22; F16H 3/089; F16H 2003/0811; F16H 2003/0818; B60Y 2200/14; B60Y 2200/221; B60Y 2200/91; B60Y 2400/421; B60Y 2400/422; B60Y 2400/428
See application file for complete search history.

(56) References Cited

U.S. PATENT DOCUMENTS

| | | | |
|---|---|---|---|
| 2016/0017958 A1* | 1/2016 | Wu | F16H 3/006 |
| | | | 74/665 D |
| 2016/0207392 A1* | 7/2016 | Zhang | B60K 6/52 |
| 2021/0008969 A1 | 1/2021 | Chopra et al. | |
| 2021/0086558 A1 | 3/2021 | Baillie et al. | |
| 2022/0134863 A1* | 5/2022 | Beck | B60K 6/48 |
| | | | 180/65.21 |
| 2022/0196121 A1* | 6/2022 | Wehlen | B60K 1/02 |
| 2022/0355657 A1* | 11/2022 | Kawamoto | B60K 6/40 |
| 2023/0029811 A1* | 2/2023 | Stalberg | B60K 1/02 |
| 2023/0278409 A1* | 9/2023 | Li | B60K 1/02 |
| | | | 180/65.7 |
| 2023/0339314 A1* | 10/2023 | Karlsson | F16H 3/091 |

FOREIGN PATENT DOCUMENTS

| | | |
|---|---|---|
| DE | 10 2012 013 375 A1 | 1/2014 |
| DE | 10 2017 220 073 A1 | 10/2018 |
| WO | WO 2019/161395 A1 | 8/2019 |
| WO | WO 2021/136669 A1 | 7/2021 |

OTHER PUBLICATIONS

French Preliminary Search Report issued Sep. 2, 2022 in FR 22 00123 filed Jan. 8, 2022, 16 pages (with Translation of Category of Cited Documents and Written Opinion).

* cited by examiner

PROPULSION SYSTEM FOR AN ELECTRIC VEHICLE

TECHNICAL FIELD OF THE INVENTION

The invention relates to a propulsion system for an electric vehicle. This propulsion system notably comprises a plurality of electric machines providing a drive torque, a series of gear trains and separate selective coupling systems capable of providing a plurality of speed reduction ratios and a plurality of separate operating modes for the user of the vehicle.

Such a vehicle has purely electrical propulsion, having no propulsion combustion engine. The electric vehicle may be a motor vehicle or an industrial vehicle, such as a heavy goods vehicle, a bus or a tractor.

PRIOR ART

Such a propulsion system is known, for example, from patent application WO17080571 A1. The propulsion system according to that patent application comprises a first electric machine and a second electric machine, and a transmission arranged so as to transmit a torque from said electric machines to a pair of driven wheels of a vehicle. The first electric machine is connected in terms of drive to a first input shaft of the transmission and the second electric machine is connected in terms of drive to a second input shaft of the transmission. This propulsion system is distinguished by a first torque path, which makes it possible to transmit a torque, comprising a single transmission ratio between the first input shaft and an output shaft of the transmission, and by a second torque path, which makes it possible to transmit a torque, comprising two selectable and separately engageable transmission ratios between the second input shaft and said output shaft of the transmission, the three transmission ratios of the first and second torque paths being different from each other.

Such a propulsion system is restrictive because the electric machines cannot operate at the same operating speed because they are situated on two different torque paths, thus rendering the control of the electric machines complex.

There is a need to further improve electric vehicle propulsion systems comprising a plurality of electric motors and having a plurality of speed reduction ratios.

SUMMARY OF THE INVENTION

The invention aims to meet this need and does so, according to one of its aspects, with the aid of a propulsion system for an electric vehicle, comprising:
- an assembly of n electric propulsion machines, n being an integer greater than or equal to 3, each electric machine comprising a stator and a rotor having an output shaft that is movable in rotation about an axis;
- a common gearwheel that is kinematically connected to the n output shafts and that is able to receive the drive torque provided by the n electric machines, the n electric machines being angularly distributed around the common gearwheel so as to form a first speed reducer, the propulsion system comprising:
- primary gearwheels able to be driven by the common gearwheel;
- an intermediate shaft able to be driven by intermediate gearwheels, each primary gearwheel being kinematically connected to a corresponding intermediate gearwheel so as to form a pair of gears with which a second speed reducer is associated;
- a secondary shaft that is able to drive an assembly of one or more driving wheels of the vehicle and that has a secondary gearwheel kinematically connected to the intermediate shaft so as to form a third speed reducer;

wherein a first selective coupling system, disposed between the common gearwheel and the primary gearwheels or alternatively between the intermediate shaft and the intermediate gearwheels, selects a first pair of gears or a second pair of gears from a neutral position.

The angular distribution of the n electric machines around the common gearwheel allows the propulsion system to be installed with a smaller footprint, axially speaking.

More specifically, the secondary shaft may have a secondary gearwheel kinematically connected to the intermediate shaft by an intermediate gearwheel, so as to form a third speed reducer. For example, this intermediate gearwheel is separate from those associated with the second speed reducer. The secondary shaft may have, for example, three axially aligned intermediate gearwheels.

Preferably, the n electric machines are similar, for example wound-rotor or permanent-magnet synchronous electric machines. In a variant, they may be asynchronous machines, for example. The use of a plurality of similar electric machines makes it possible to reduce the production costs and to facilitate the control of the electric machines.

Within the meaning of the present application:
- a coupling system coupling two components is selective when it allows the two components to be coupled or uncoupled according to the instruction received,
- a coupling system coupling two components and which is not selective permanently couples these two components,
- two components coupled by one of the aforementioned coupling systems are secured to one another such that they rotate as one. This securing may correspond to torque lockup in instances in which the coupling system employs a dog clutch and this securing may employ a friction transmission in instances in which the coupling system employs a clutch, and
- "upstream" and "downstream" are defined with respect to the direction of torque transfer from an electric machine to the wheels of the vehicle.

Preferably, the secondary shaft, on the basis of a drive torque $C_0$ transmitted by the n electric machines, may be able to selectively receive: a torque $C_1$ that has passed via the first pair of gears, or a torque $C_2$ that has passed via the second pair of gears such that $C_1 > C_2$.

Advantageously, the first ratio between the drive torque $C_0$ and the torque $C_1$ that has passed via the first pair of gears may be between 10 and 15, such that $10 < C_0/C_1 < 15$, and the second ratio between the drive torque $C_0$ and the torque $C_2$ that has passed via the second pair of gears may be between 5 and 10, such that $5 < C_0/C_2 < 10$.

Preferably, the n electric machines may be regularly distributed about the axis of rotation of the common gearwheel at an angle $\Delta$ equal to $360°/n$.

Each electric machine may be configured to operate reversibly, in which case it is associated with electronics such as an inverter/rectifier allowing it alternately: to be supplied with electrical energy in order to provide a drive torque, and to generate electrical energy on the basis of a torque received on its shaft when the vehicle brakes or when it rolls when launched, for example.

Each electric machine is, for example, a rotary electric machine.

Each electric machine may be configured to operate reversibly, in which case it is associated with electronics such as an inverter/rectifier allowing it alternately: to be supplied with electrical energy in order to provide a drive torque, and to generate electrical energy on the basis of a torque received on its shaft when the vehicle brakes or when it rolls when launched, for example.

The n electric machines may provide the same mechanical nominal power, this power being, for example, between 50 kW and 150 kW, possibly being equal to 120 kW, for example. The use of identical electric machines may make it possible to reduce the production costs of the propulsion system, by reducing the need for specific developments from one machine to the other, and by increasing the volumes.

The propulsion system may comprise a transmission shaft equipped with universal joints, connecting the secondary shaft to a differential. This differential may be a mechanical differential or an electronic differential controlling the output torque fed to each driving wheel of the vehicle. Notably, the differential may be disposed so as to selectively receive: the torque C1 that has passed via the first pair of gears, or the torque C2 that has passed via the second pair of gears such that C1>C2. This differential may be associated with the rear axle of the vehicle. In a variant, the differential may be kinematically connected directly to the secondary shaft. In this way, the axial footprint of the propulsion system may be reduced.

Preferably, the propulsion system may comprise a transmission casing supporting the n electric machines and the common gearwheel with the aid of at least one guide bearing. The transmission casing bears more uniformly distributed mechanical stresses due to the angular distribution of the n electric machines around the common gearwheel.

Advantageously, the transmission casing may comprise a fluid circulation circuit passing between the n electric machines in order to discharge heat energy emitted during the transmission of a torque.

Preferably, the axis of rotation of the common gearwheel, the axis of the intermediate shaft and the axis of the secondary shaft may be parallel.

Advantageously, the secondary shaft may be driven by the secondary gearwheel by way of a second selective coupling system. In this way, it is possible to disconnect the propulsion system from the wheels of the vehicle. The propulsion system and notably the electric machines are thus protected.

Preferably, the second selective coupling means may take the form of a dog clutch or a synchronizer.

According to a first embodiment variant of the invention, the first selective coupling system disposed between the common gearwheel and the primary gearwheels takes the form of a dog clutch or a synchronizer.

According to a second embodiment variant of the invention, the first selective coupling system disposed between the common gearwheel and the primary gearwheels takes the form of a dual clutch, notably a dual wet clutch.

Preferably, the dual wet clutch may have a radial-type architecture in which first and second multi-disc clutches are disposed radially one above the other, the dual wet clutch comprising a torque transmission housing that is common to the first and second multi-disc clutches and that is secured to rotate as one with the common gearwheel.

In a variant, the dual wet clutch may have an axial-type architecture in which first and second multi-disc clutches are disposed axially one next to the other, the dual wet clutch comprising a torque transmission housing that is common to the first and second multi-disc clutches and that is secured to rotate as one with the common gearwheel.

Advantageously, the common gearwheel may circumferentially surround the torque transmission housing.

Advantageously, the transmission casing may support the torque transmission housing directly and supply fluid to the first and second multi-disc clutches.

According to a third embodiment variant of the invention, the first selective coupling system disposed between the intermediate shaft and the intermediate gearwheels takes the form of a dog clutch or a synchronizer.

Throughout the foregoing, when the propulsion system comprises the first and second selective coupling systems, this propulsion system may also comprise a control member for controlling the first and second selective coupling systems such that the propulsion system can adopt all or some of the following configurations:

a configuration according to which the secondary shaft receives a torque C1 passing via the first pair of gears, the first selective coupling system being in a first coupling position and the second selective coupling system being in a coupling position, a configuration according to which the secondary shaft receives a torque C2 passing via the second pair of gears, the first selective coupling system being in a second coupling position that is different from the first position and the second selective coupling system being in the coupling position, and a maintenance configuration in which the first and second coupling systems are in an uncoupling neutral position.

The control member may, for example, be incorporated into the vehicle processor (ECU). In a variant, the control member may be incorporated into the transmission control unit (TCU). In a further variant, the control member may be modular and the control module for controlling the first coupling system is incorporated into the transmission control unit whereas the control module for controlling the second coupling system is incorporated into the ECU.

BRIEF DESCRIPTION OF THE FIGURES

Further features and advantages of the invention will become apparent from reading the following description, with reference to the appended figures.

For greater clarity, identical or similar elements are identified using identical reference signs in all of the figures.

DETAILED DESCRIPTION OF EMBODIMENTS

Figure 1:
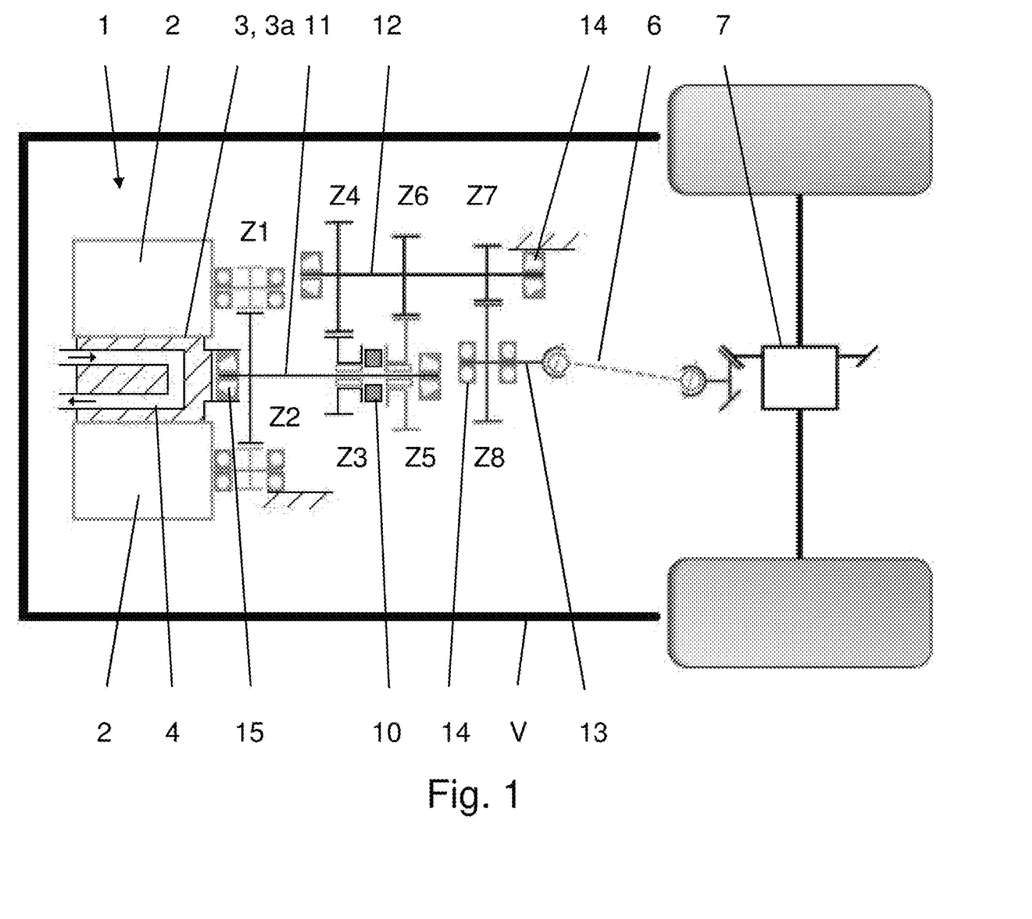
FIG. 1 is a view in elevation of a propulsion system for an electric vehicle according to a first implementation example of the invention.
Figure 2:
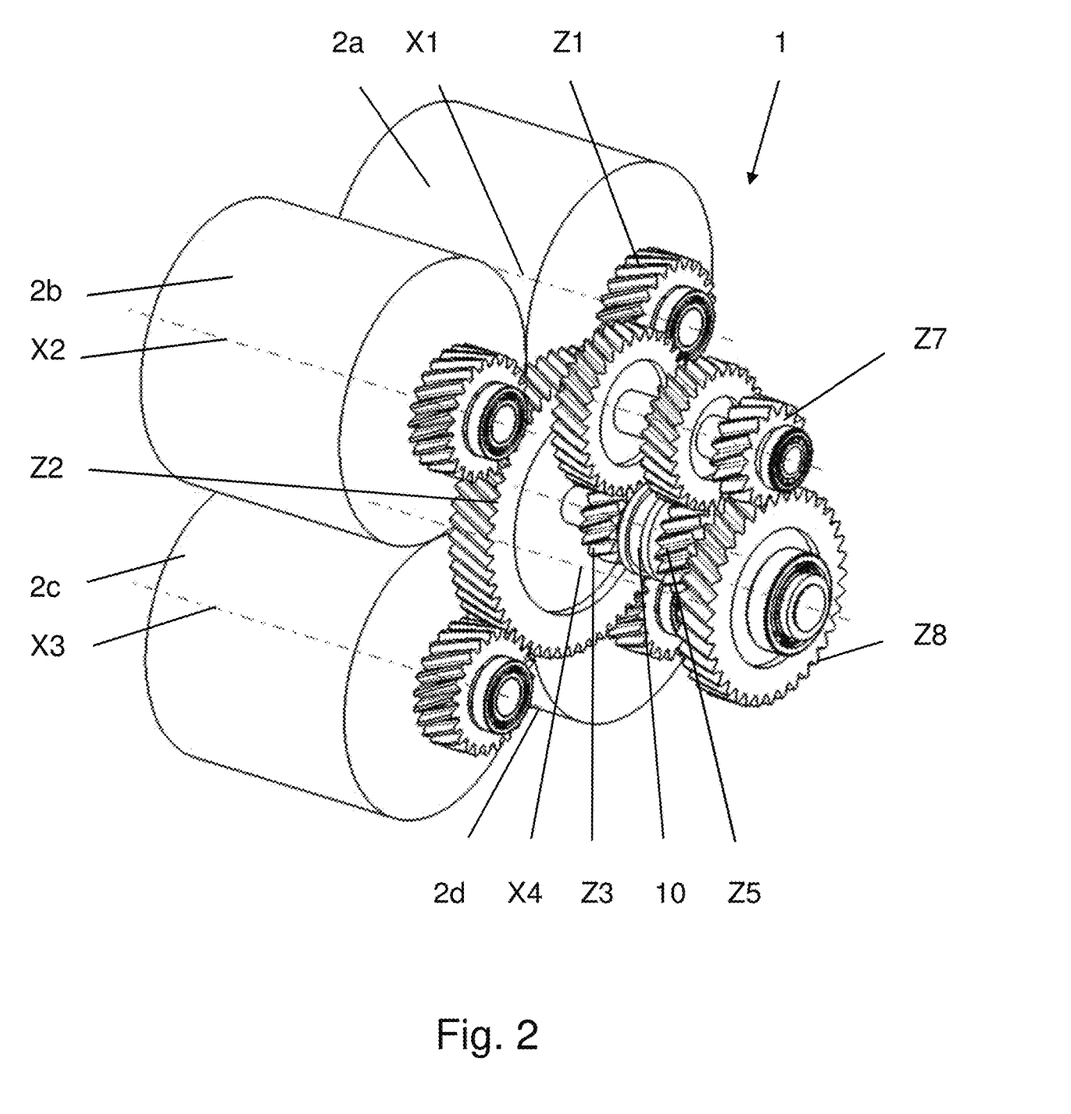
FIG. 2 is a partial isometric view of the propulsion system in FIG. 1.

FIGS. 1 and 2 show a propulsion system 1 for an electric vehicle V according to a first implementation example of the invention.

Here, this propulsion system 1 is purely electric, that is to say it does not use a combustion engine to drive the vehicle, which is an industrial vehicle in this case, for example a heavy goods vehicle. This propulsion system 1 comprises an assembly of n electric propulsion machines 2, n being an integer greater than or equal to 3, each electric machine comprising a stator and a rotor having an output shaft that is movable in rotation about an axis. In the first implementation example of the invention shown in FIGS. 1 and 2, the assembly comprises four electric propulsion machines 2a, 2b, 2c and 2d.

The rotary electric machines 2a, 2b, 2c, 2d are of the same type and are, for example, permanent-magnet synchronous machines. Each electric machine provides the same mechanical nominal power, this power being, for example, of the order of 100 kW. In a variant, they may be asynchronous machines, for example.

As can be seen in FIG. 2, in the example described, the first electric machine 2a has a rotor with a first output shaft rotating about a first axis of rotation $X1$, the second electric machine 2b has a rotor with a second output shaft rotating about a second axis of rotation $X2$, the third electric machine 2c has a rotor with a third output shaft rotating about a third axis of rotation $X3$, and the fourth electric machine 2d has a rotor having a fourth output shaft rotating about a fourth axis of rotation $X4$. In the example described, the axes of rotation of the rotary electric machines are parallel but not coincident, the axes of rotation of the four electric machines 2a, 2b, 2c, 2d not being aligned.

The four electric machines are regularly distributed about the axis of rotation of the common gearwheel at an angle $\Delta$ equal to 90°.

The output shafts of the four electric machines simultaneously mesh with a common gearwheel 11 disposed within the axes $X1$, $X2$, $X3$ and $X4$. The common gearwheel 11 is kinematically connected to the four output shafts and receives the drive torque $C0$ provided by the four electric machines, the four electric machines being angularly distributed around the common gearwheel so as to form a first speed reducer $Z1$, $Z2$.

A transmission casing 3 supports the four electric machines and the common gearwheel 11 with the aid of a guide bearing 15. The guide bearing may be a roller bearing or a ball bearing. The transmission casing 3 notably comprises a central core 3a situated in the centre of the electric machines. The central core 3a comprises a fluid circulation circuit 4 passing between the four electric machines in order to discharge heat energy emitted during the transmission of torque within the propulsion system. The fluid may be cooling oil or an aqueous solution.

The propulsion system 1 comprises primary gearwheels $Z3$, $Z5$ able to be driven by the common gearwheel by means of a first selective coupling system 10. The first selective coupling system 10 disposed between the common gearwheel 11 and the primary gearwheels $Z3$, $Z5$ makes it possible to select a first pair of gears $Z3$, $Z4$ or a second pair of gears $Z5$, $Z6$ from an uncoupling neutral position. This first selective coupling system 10 with three positions takes the form of a dog clutch. In a variant, the first coupling system may comprise two coupling sub-assemblies, the first being associated solely with the first pair of gears $Z3$, $Z4$ and the second being associated solely with the second pair of gears $Z5$, $Z6$. In a variant, the coupling system may take the form of a synchronizer.

The propulsion system 1 comprises an intermediate shaft 12 able to be driven by intermediate gearwheels $Z4$, $Z6$ and $Z7$, each primary gearwheel $Z3$, $Z5$ being kinematically connected to a corresponding intermediate gearwheel $Z4$, $Z6$ so as to form a pair of gears with which a second speed reducer is associated. The intermediate shaft 12 is supported in rotation by a housing attached to the transmission casing 3 with the aid of guide bearings 14.

The propulsion system 1 also comprises a secondary shaft 13 able to drive an assembly of one or more driving wheels of the vehicle. The secondary shaft 13 has a secondary gearwheel $Z8$ kinematically connected to the intermediate shaft 12 by the intermediate gearwheel $Z7$, so as to form a third speed reducer $Z7$, $Z8$.

In this first implementation example of the invention, the axis of rotation 110 of the common gearwheel 11, the axis of rotation 120 of the intermediate shaft 12 and the axis of rotation 130 of the secondary shaft 13 are parallel.

As a function of the configuration of the first selective coupling system 10 for selecting either a first pair of gears $Z3$, $Z4$ or a second pair of gears $Z5$, $Z6$, the secondary shaft 13 receives different torque values. On the basis of a drive torque $C0$ transmitted by the four electric machines, the secondary shaft selectively receives: the torque $C1$ that has passed via the first pair of gears, or the torque $C2$ that has passed via the second pair of gears such that $C1>C2$.

Advantageously, the first ratio between the drive torque $C0$ and the torque $C1$ that has passed via the first pair of gears $Z3$, $Z4$ may be between 10 and 15, such that $10<C0/C1<15$, and the second ratio between the drive torque $C0$ and the torque $C2$ that has passed via the second pair of gears $Z5$, $Z6$ may be between 5 and 10, such that $5<C0/C2<10$.

By way of indication, in the context of an industrial vehicle, the first ratio may be equal to 10.5 and the second ratio may be equal to 6.

As illustrated in FIG. 1, a transmission shaft 6 equipped with universal joints connects the secondary shaft 13 to a differential 7. This differential 7 may be a mechanical differential or an electronic differential controlling the output torque fed to each driving wheel of the vehicle. Notably, the differential may be disposed so as to selectively receive: the torque $C1$ that has passed via the first pair of gears $Z3$, $Z4$, or the torque $C2$ that has passed via the second pair of gears $Z5$, $Z6$.

The transitional phase of changing to a higher speed reduction ratio for the propulsion system 1 will now be described.

During the running phase of the electric vehicle V between a time $t0$ and $t1$, the first speed reduction ratio is considered to be engaged and the first selective coupling system 10 is considered to be in a first coupling position in which the first pair of gears $Z3$, $Z4$ is selected.

Between a time $t1$ and $t2$, the propulsion system passes from the engaged position to the neutral position, with the dog clutch 10 being disengaged. The first selective coupling system 10 is now in an uncoupling neutral position. In order to prepare for the engagement of the dog clutch 10 in a second coupling position, the relative speed of rotation between the common gearwheel 11 and the primary gearwheel $Z5$ is measured by using various speed sensors present in the propulsion system 1. In this phase, the electric machines no longer provide torque.

Between a time $t2$ and $t3$, the reversible electric machines 2 are activated in order to slow the common gearwheel 11 so as to synchronize the speeds of rotation of the common gearwheel 11 and of the primary gearwheel $Z5$.

Between a time $t3$ and $t4$, the dog clutch 10 is engaged to couple the common gearwheel 11 to the associated primary gearwheel $Z5$ when their speeds of rotation are synchronized. The second speed reduction ratio is engaged when the first selective coupling system 10 is in a second coupling position in which the second pair of gears $Z5$, $Z6$ is selected.

After the time t4, the electric machines provide torque again.

By virtue of the use of reversible electric machines 2, it is possible to reduce the jaw clutching times, without resorting to a gearbox brake.

The transitional phase of changing to a lower speed reduction ratio for the propulsion system 1 will now be described.

During the running phase of the electric vehicle V between a time t0 and t1, the second speed reduction ratio is considered to be engaged and the first selective coupling system 10 is considered to be in a second coupling position in which the second pair of gears Z5, Z6 is selected.

Between a time t1 and t2, the propulsion system passes from the engaged position to the neutral position, with the dog clutch 10 being disengaged. The first selective coupling system 10 is now in an uncoupling neutral position. In order to prepare for the engagement of the dog clutch 10 in a first coupling position, the relative speed of rotation between the common gearwheel 11 and the primary gearwheel Z3 is measured by using various speed sensors present in the propulsion system. In this phase, the electric machines no longer provide torque.

Between a time t2 and t3, the reversible electric machines 2 are activated in order to accelerate the common gearwheel 11 so as to synchronize the speeds of rotation of the common gearwheel 11 and of the primary gearwheel Z3.

Between a time t3 and t4, the dog clutch 10 is engaged to couple the common gearwheel 11 to the associated primary gearwheel Z3 when their speeds of rotation are synchronized. The first speed reduction ratio is engaged when the first selective coupling system 10 is in a first coupling position in which the first pair of gears Z3, Z4 is selected.

After the time t4, the electric machines provide torque again.

By virtue of the use of reversible electric machines 2, it is possible to reduce the jaw clutching times, without resorting to a gearbox brake.

In this first embodiment of the invention, the secondary shaft 13 may be driven by the secondary gearwheel Z8 by way of a second selective coupling system. In this way, it is possible to disconnect the propulsion system from the wheels of the vehicle. This second selective coupling means may take the form of a dog clutch or a synchronizer.

Figure 3:
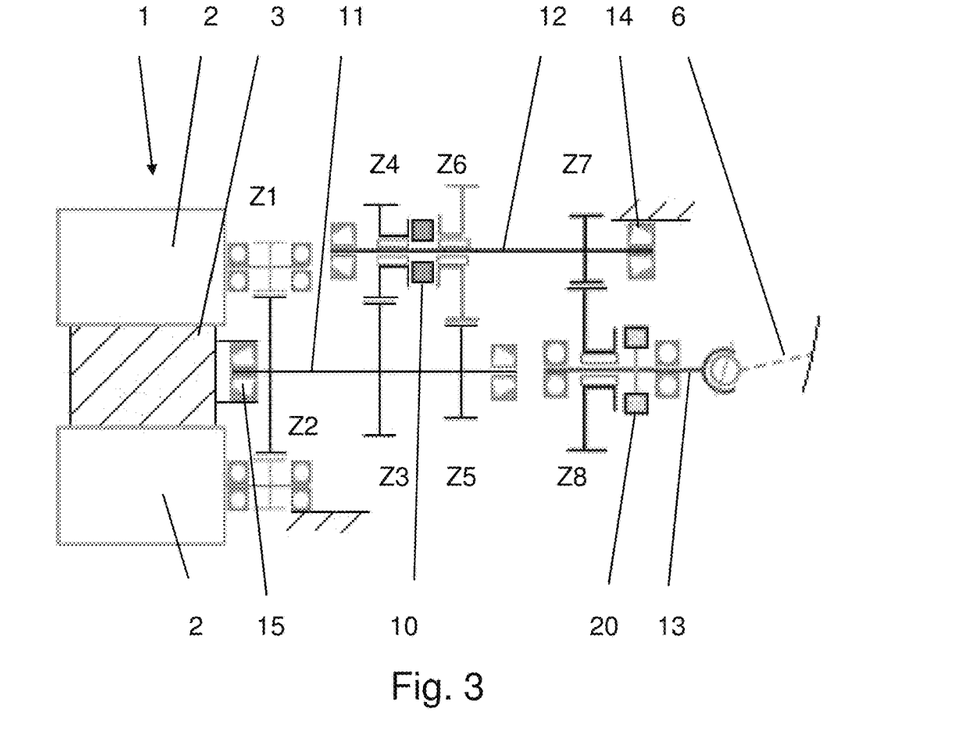
FIG. 3 shows a propulsion system according to a second implementation example of the invention.

FIG. 3 illustrates a second embodiment of the invention, which differs from the preceding embodiment by the positioning of the first selective coupling system 10 between the intermediate shaft 12 and the intermediate gearwheels Z4, Z6. This arrangement has the advantage of being able to offset the selective coupling system and of facilitating the integration of its control device within the propulsion system.

The operation of this second embodiment is similar to the first embodiment of the invention since the structure of the propulsion system 1 is unchanged. The common gearwheel 11 is still kinematically connected to the four output shafts and receives the drive torque C0 provided by the four electric machines, the four electric machines being angularly distributed around the common gearwheel so as to form a first speed reducer Z1, Z2.

During the transitional phases of changing to a lower or higher speed reduction ratio, the speeds of rotation of the intermediate gearwheels Z4, Z6 and of the intermediate shaft 12 are still synchronized by acceleration or slowing of the common gearwheel 11, but taking account of the speed reduction ratio of the first pair of gears or of the second pair of gears.

In this second embodiment of the invention, the secondary shaft 13 is driven by the secondary gearwheel Z8 by way of a second selective coupling system 20. In this way, it is possible to disconnect the propulsion system from the wheels of the vehicle. This second selective coupling means takes the form of a dog clutch.

The propulsion system also comprises a control member 50 for controlling the first and second selective coupling systems 10, 20 when these two coupling systems are present. The control member 50 is programmed so that the propulsion system can adopt the following configurations:
a configuration (i) according to which the secondary shaft 13 receives the torque C1 passing via the first pair of gears, the first selective coupling system 10 being in a first coupling position and the second selective coupling system 20 being in a coupling position,
a configuration (ii) according to which the secondary shaft 13 receives the torque C2 passing via the second pair of gears, the first selective coupling system being in a second coupling position that is different from the first position and the second selective coupling system being in the coupling position, and
a maintenance configuration (iii) in which the first and second coupling systems are in an uncoupling neutral position.

The control of the coupling systems that is effected by the control member 50 in order to obtain the configurations (i) to (iii) above is indicated in the table below.

| Configuration | First coupling system 10 | Second coupling system 20 |
| --- | --- | --- |
| (i) | Coupling according to a first position | Coupling |
| (ii) | Coupling according to a second position | Coupling |
| (iii) | Uncoupling | Uncoupling |

Configuration (i) is for example suited to low vehicle speeds with high torque demands.

Configuration (ii) is for example suited to high vehicle speeds with low torque demands.

Configuration (iii) is for example suited to operation as a maintenance mode for which the wheels of the vehicle can rotate without driving the propulsion system.

Figure 4:
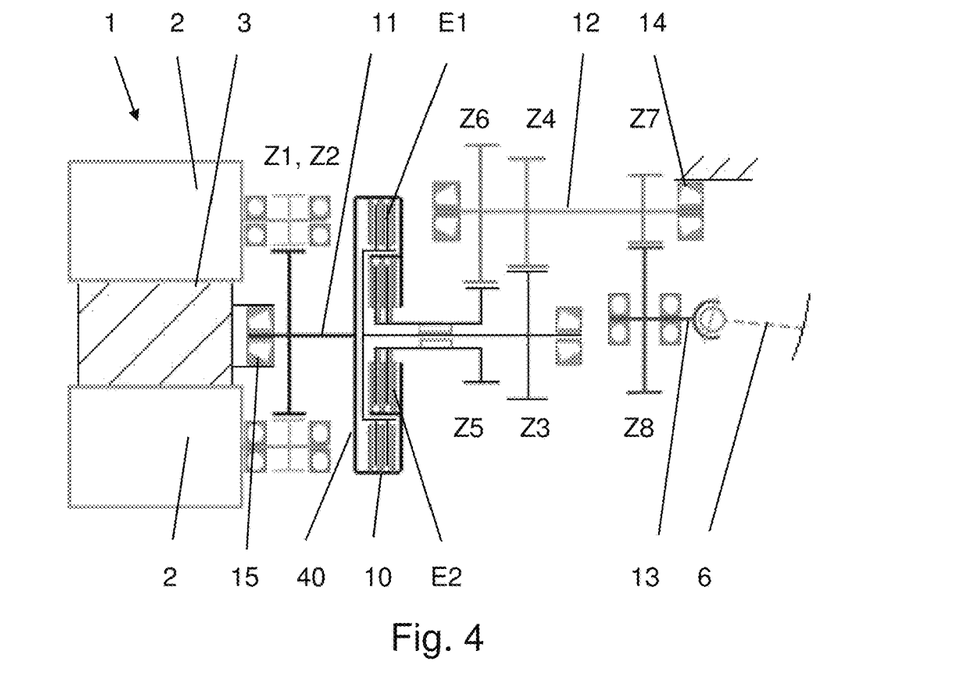
FIG. 4 shows a propulsion system according to a third implementation example of the invention.

FIG. 4 illustrates a third embodiment of the invention, which differs from the first embodiment by a first selective coupling system 10 that is disposed between the common gearwheel and the primary gearwheels and that takes the form of a dual clutch, notably a dual wet clutch. This dual wet clutch 10 has the advantage of being able to dispense with the synchronization of the speeds of rotation of the common gearwheel 11 and of the primary gearwheels Z3, Z5.

The dual wet clutch 10 has a radial-type architecture in which first and second multi-disc clutches E1, E2 are disposed radially one above the other. More specifically, in this example, the first multi-disc clutch E1 is disposed radially around the second multi-disc clutch E2. A torque transmission housing 40 common to the first and second multi-disc clutches E1, E2 is secured to rotate as one with the common gearwheel 11.

The first multi-disc clutch E1 is associated with the first pair of gears Z3, Z4 whereas the second multi-disc clutch E2 is associated with the second pair of gears Z5, Z6. The uncoupling neutral position is obtained by simultaneously opening both clutches.

Advantageously, the first multi-disc clutch E1 disposed radially around the second multi-disc clutch E2 is associated with the first ratio between the drive torque C0 and the torque C1 that has passed via the first pair of gears Z3, Z4. The second multi-disc clutch E2 is associated with the second ratio between the drive torque C0 and the torque C2 that has passed via the second pair of gears Z5, Z6.

Figure 5:
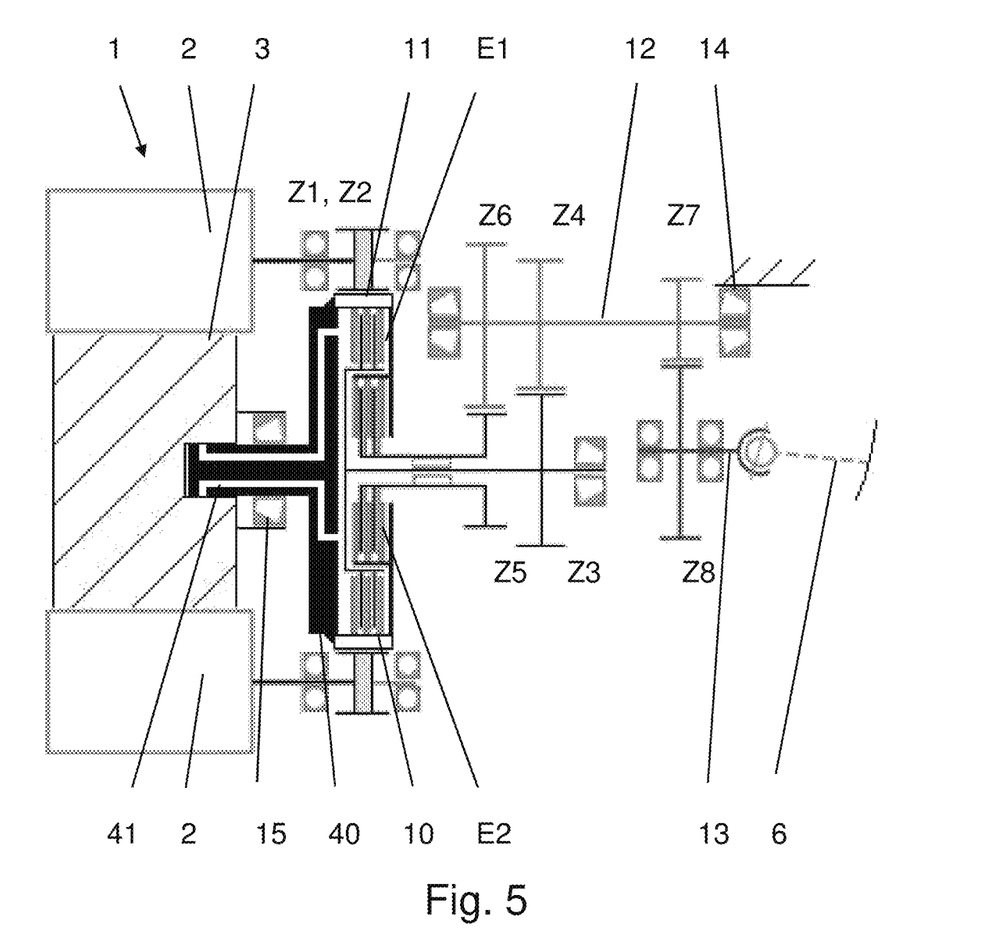
FIG. 5 shows a propulsion system according to a fourth implementation example of the invention.

FIG. 5 illustrates a fourth embodiment of the invention, which differs from the third embodiment by the fact that the common gearwheel 11 circumferentially surrounds the torque transmission housing 40. In this fourth embodiment, the torque transmission housing 40 common to the first and second multi-disc clutches is secured to rotate as one with the common gearwheel 11. For example, the common gearwheel 11 is attached to the torque transmission housing 40 or machined directly on the housing 40.

Advantageously, the transmission casing 3 supports the torque transmission housing 40 directly and supplies fluid to the first and second multi-disc clutches, notably to the control chambers of the clutches E1, E2. Pressurized-fluid supply ducts 41 that open out into the transmission casing 3 pass through the torque transmission housing 40 and extend axially through the guide bearing 15.

In a variant, the dual wet clutch may have an axial-type architecture in which first and second multi-disc clutches E1, E2 are disposed axially one next to the other and in which a torque transmission housing common to the first and second multi-disc clutches is secured to rotate as one with the common gearwheel. In this variant, the common gearwheel circumferentially surrounds the torque transmission housing.

The invention is not limited to the examples that have just been described.

The invention claimed is:

1. A propulsion system for an electric vehicle, comprising:
   an assembly of n electric propulsion machines, n being an integer greater than or equal to 3, each electric machine comprising a stator and a rotor having an output shaft that is movable in rotation about an axis;
   a common gearwheel that is kinematically connected to the n output shafts and that is able to receive the drive torque C0 provided by the n electric machines, the n electric machines being angularly distributed around the common gearwheel so as to form a first speed reducer,
   the propulsion system comprising:
   primary gearwheels able to be driven by the common gearwheel,
   an intermediate shaft able to be driven by intermediate gearwheels, each primary gearwheel being kinematically connected to a corresponding intermediate gearwheel so as to form a pair of gears with which a second speed reducer is associated,
   a secondary shaft that is able to drive an assembly of one or more driving wheels of the vehicle and that has a secondary gearwheel kinematically connected to the intermediate shaft so as to form a third speed reducer,
   wherein a first selective coupling system, disposed between the common gearwheel (11) and the primary gearwheels or alternatively between the intermediate shaft and the intermediate gearwheels, selects a first pair of gears or a second pair of gears from a neutral position.

2. The propulsion system according to claim 1, wherein the secondary shaft, on the basis of a drive torque C0 transmitted by the n electric machines, is able to selectively receive: a torque C1 that has passed via the first pair of gears, or a torque C2 that has passed via the second pair of gears such that C1>C2.

3. The propulsion system according to claim 2, wherein the first ratio between the drive torque C0 and the torque C1 that has passed via the first pair of gears is between 10 and 15, such that 10<C0/C1<15, and the second ratio between the drive torque C0 and the torque C2 that has passed via the second pair of gears is between 5 and 10, such that 5<C0/C2<10.

4. The propulsion system according to claim 2, wherein the n electric machines are regularly distributed about the axis of rotation of the common gearwheel at an angle Δ equal to 360°/n.

5. The propulsion system according to claim 2, comprising a transmission casing supporting the n electric machines and the common gearwheel with the aid of at least one guide bearing.

6. The propulsion system according to claim 2, wherein the transmission casing comprises a fluid circulation circuit passing between the n electric machines in order to discharge heat energy emitted during the transmission of a torque.

7. The propulsion system according to claim 2, wherein the axis of rotation of the common gearwheel, the axis of the intermediate shaft and the axis of the secondary shaft are parallel.

8. The propulsion system according to claim 2, comprising a transmission shaft equipped with universal joints, connecting the secondary shaft to a differential.

9. The propulsion system according to claim 1, wherein the n electric machines are regularly distributed about the axis of rotation of the common gearwheel at an angle Δ equal to 360°/n.

10. The propulsion system according to claim 1, comprising a transmission casing supporting the n electric machines and the common gearwheel with the aid of at least one guide bearing.

11. The propulsion system according to claim 1, wherein the transmission casing comprises a fluid circulation circuit passing between the n electric machines in order to discharge heat energy emitted during the transmission of a torque.

12. The propulsion system according to claim 1, wherein the axis of rotation of the common gearwheel, the axis of the intermediate shaft and the axis of the secondary shaft are parallel.

13. The propulsion system according to claim 1, comprising a transmission shaft equipped with universal joints, connecting the secondary shaft to a differential.

14. The propulsion system according to claim 1, wherein the n electric machines provide the same mechanical nominal power, this power being, for example, between 50 kW and 150 kW.

15. The propulsion system according to claim 1, wherein the first selective coupling system disposed between the common gearwheel and the primary gearwheels takes the form of a dog clutch or a synchronizer.

16. The propulsion system according to claim 1, wherein the first selective coupling system disposed between the common gearwheel and the primary gearwheels takes the form of a dual clutch, notably a dual wet clutch.

17. The propulsion system according to claim 16, wherein the dual wet clutch has a radial-type architecture in which first and second multi-disc clutches are disposed radially one above the other, the dual wet clutch comprising a torque transmission housing that is common to the first and second multi-disc clutches and that is secured to rotate as one with the common gearwheel.

18. The propulsion system according to claim 16, wherein the secondary shaft is driven by the secondary gearwheel by way of a second selective coupling system.

19. The propulsion system according to claim 18, wherein the second selective coupling system takes the form of a dog clutch or a synchronizer.

20. The propulsion system according to claim 18, comprising a control member for controlling the first and second selective coupling systems such that the propulsion system can adopt all or some of the following configurations:
   a configuration (i) according to which the secondary shaft receives a torque C1 passing via the first pair of gears, the first selective coupling system being in a first coupling position and the second selective coupling system being in a coupling position,
   a configuration (ii) according to which the secondary shaft receives a torque C2 passing via the second pair of gears, the first selective coupling system being in a second coupling position that is different from the first position and the second selective coupling system being in the coupling position, and
   a maintenance configuration (iii) in which the first and second coupling systems are in an uncoupling neutral position.

\* \* \* \* \*